United States Patent [19]

Yin-Han

[11] Patent Number: 5,303,469
[45] Date of Patent: Apr. 19, 1994

[54] CUTTER KNIFE

[76] Inventor: Huang Yin-Han, P.O. Box 82-144, Taipei, Taiwan

[21] Appl. No.: 46,139

[22] Filed: Apr. 15, 1993

[51] Int. Cl.5 .............................................. B23D 51/10
[52] U.S. Cl. .......................................... 30/2; 30/122; 30/329; 30/517
[58] Field of Search ...................... 30/2, 122, 329, 337, 30/517

[56] References Cited

U.S. PATENT DOCUMENTS

| | | | |
|---|---|---|---|
| 194,659 | 8/1877 | Disston et al. | 30/517 |
| 2,452,148 | 10/1948 | Rhodes | 30/517 |
| 3,027,641 | 4/1962 | Leonardson | 30/329 |
| 3,447,580 | 6/1969 | Keymer | 30/517 |
| 4,575,940 | 3/1986 | Wenzel | 30/337 X |
| 4,675,996 | 6/1987 | DuBuque | 30/2 |

*Primary Examiner*—Eugenia Jones
*Assistant Examiner*—Raymond D. Woods
*Attorney, Agent, or Firm*—Alfred Lei

[57] ABSTRACT

A cutter knife including an upper cover, a lower cover engaged with the upper cover to form a handle, a knife holder force-fitted with a front end of the lower cover and having a slit and a threaded recess, a knife partly inserted into the knife holder through the slit of the knife holder, a knob threadedly engaged with the recess of the knife holder, and a tail seat engaged with a rear end of the handle and having a slit.

1 Claim, 4 Drawing Sheets

CUTTER KNIFE

BACKGROUND OF THE INVENTION

It has been found that the prior art cutter knife falls into two categories, i.e. the fixed type and the telescopic type. However, it is necessary to dismantle the handle of the fixed type cutter knife in order to replace the blade thereby making it inconvenient to use. Further, regarding the telescopic type cutter knife, the blade thereof will be forced into the handle when a relatively large force is applied thereto.

Therefore, it is an object of the present invention to provide an improved knife which may obviate and mitigate the above-mentioned drawbacks.

SUMMARY OF THE INVENTION

This invention relates to an improved knife.

It is the primary object of the present invention to provide a cutter knife of which the knife blade is easy to replace.

It is still another object of the present invention to provide a cutter knife which is safe in use.

It is still another object of the present invention to provide a cutter knife which may be used as a saw.

It is still another object of the present invention to provide a cutter knife which may be used as a scraper.

It is a further object of the present invention to provide a cutter knife which is simple in construction.

Other objects and merits and a fuller understanding to the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
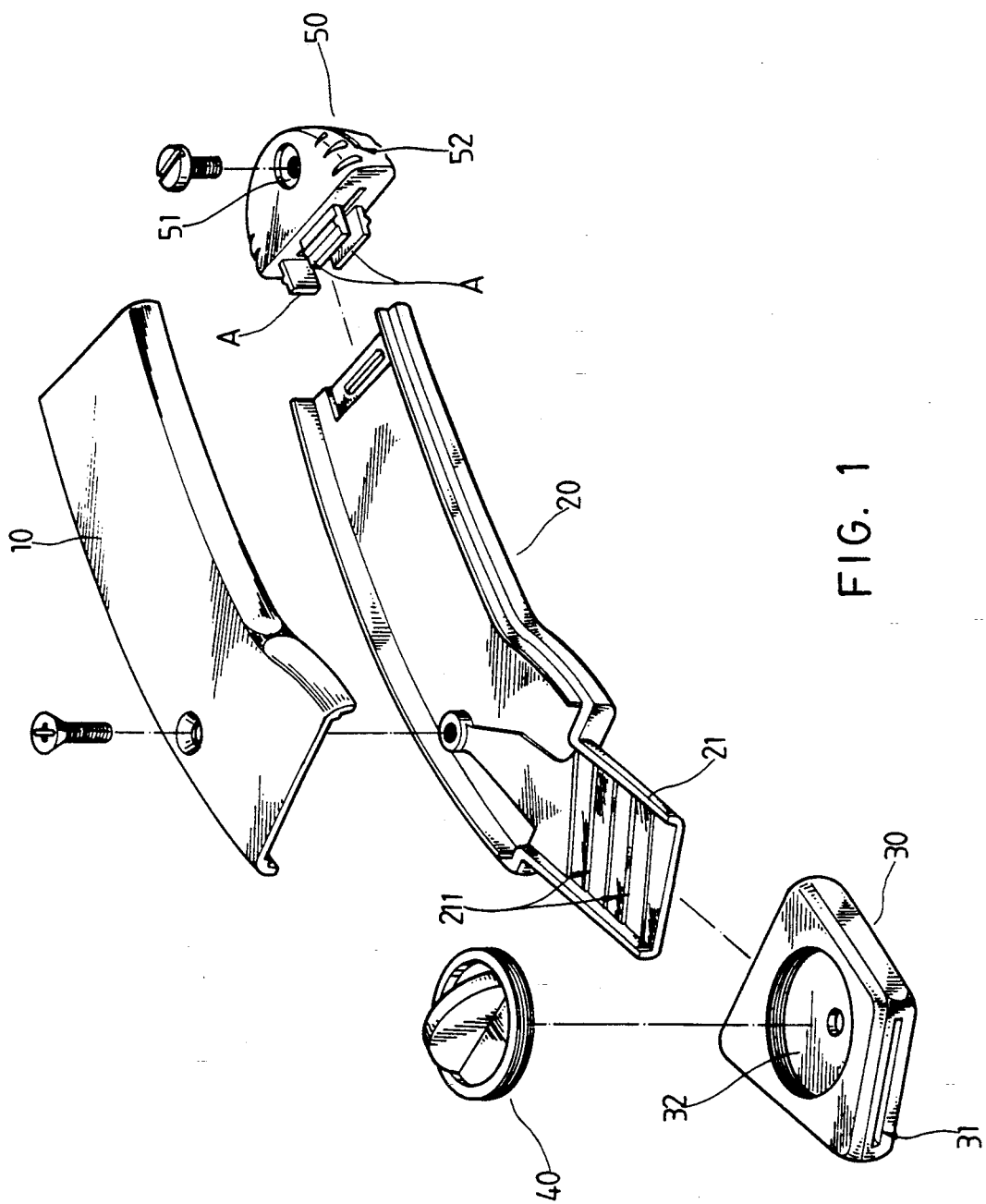
FIG. 1 is an exploded view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
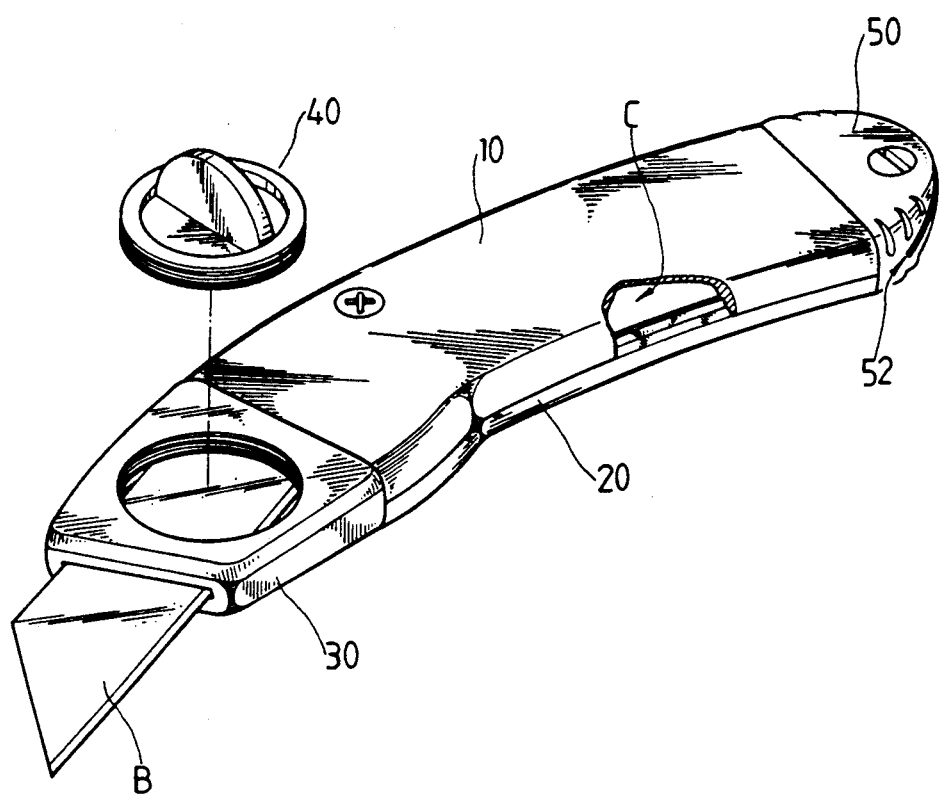
FIG. 2 is a perspective view of the present invention.

With reference to the drawings and in particular to FIGS. 1 and 2 thereof, the cutter knife according to the present invention mainly comprises an upper cover 10, a lower cover 20, a knife holder 30, a knob 40, and a tail seat 50.

The upper cover 10 is engaged with the lower cover 20 to form a handle. Further, the lower cover 20 has a front end 21 with a plurality of grooves 211.

The knife holder 30 is force-fitted with the front end 21 of the lower cover 20. In addition, the knife holder 30 is formed with a slit 31 and a threaded recess 32.

The knob 40 is threadedly engaged with the threaded recess 32 of the knife holder 30.

The tail seat 50 having a plurality of tenons A is engageable with the rear end of the handle formed by the upper cover 10 and the lower cover 20. Besides, the tail seat 50 has a threaded hole 51 for engaging with a screw.

Referring now to FIG. 2, the knife blade B is first inserted into the knife holder 30 through the slit 31 and then is fixedly kept in place by engaging the knob 40 with the threaded recess 32 of the knife holder 30. Further, the grooves 211 of the front end of the lower cover 20 will increase the frictional efficiency between the knife blade B and the knife holder 30 thereby preventing the knife blade B from detaching from the knife holder 30. When desired to remove the knife blade B from the knife holder 30, simply loosen the knob 40 and take out the knife blade B. In addition, the knife blade B may be conveniently stored within the space C of the handle when not in use.

Figure 3:
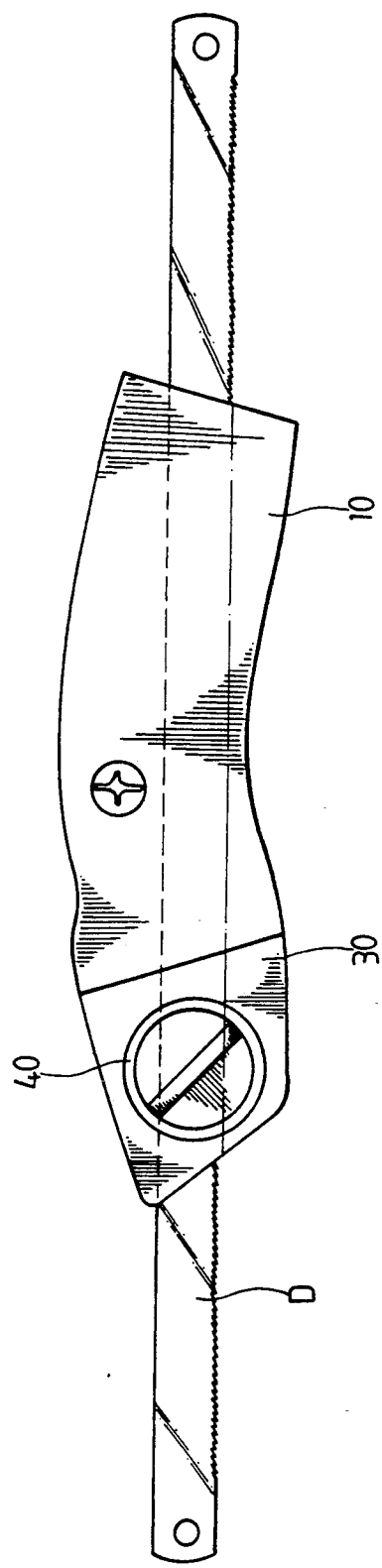
FIG. 3 is a second application of the present invention.

FIG. 3 shows a second application of the present invention. As illustrated, when desired to use the present invention as a saw, simply remove the tail seat 50 from the end of the handle, insert a saw blade D into the knife holder 30 and the handle, and turn the knob 40 tightly to keep the saw blade D in a fixed position.

Figure 4:
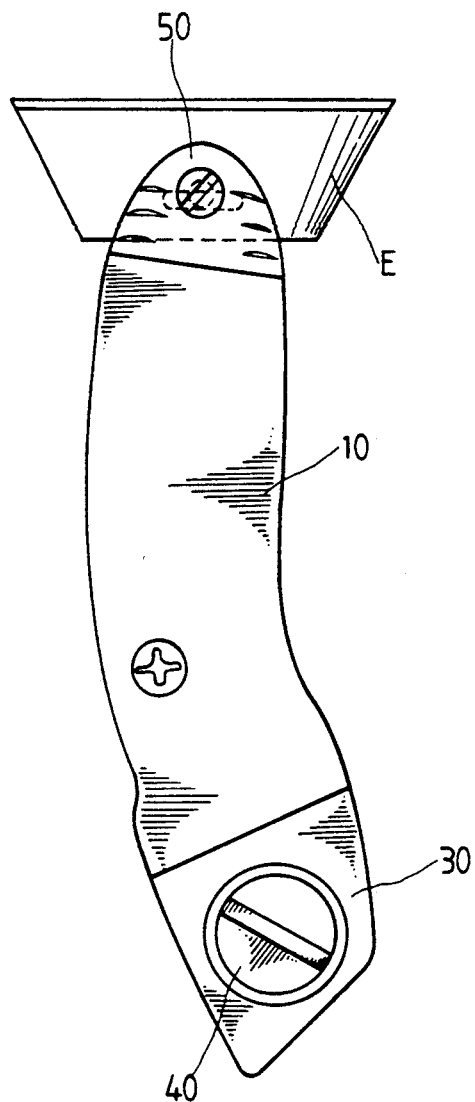
FIG. 4 is a third application of the present invention.

FIG. 4 shows a third application of the present invention. As may be seen, when desired to use the present invention as a scraper, it is only necessary to insert a knife blade E into a slot 52 of the tail seat 50 and fix the knife blade E in position by a screw.

The application of the present invention is too wide to be mentioned and cannot be all enumerated here in detail. It is understood that the present disclosure is made by way of example only and that numerous changes in the detail of construction and the combination of parts may be resorted to without departing from the spirit and scope of the invention as hereinafter claimed.

I claim:

1. A cutter knife comprising:
    an upper cover;
    a lower cover engaged with said upper cover to form a handle with a longitudinal passage and having a protruded front end formed with a plurality of grooves;
    a knife holder force-fitted with a front end of said lower cover and having a slit and a threaded recess;
    a knife partly inserted into said knife holder through the slit of said knife holder;
    a knob threadedly engaged with the threaded recess of said knife holder; and
    a tail seat having a plurality of tenons engageable with a rear end of said handle and having a slot for receiving the knife and a threaded hole; and
    a screw engageable with the threaded hole of said tail seat.

* * * * *